(12) United States Patent
Li

(10) Patent No.: US 9,973,230 B2
(45) Date of Patent: May 15, 2018

(54) PHONE COVER WITH ROTARY LATCH

(71) Applicant: Jin-Yi Li, Shanwei (CN)

(72) Inventor: Jin-Yi Li, Shanwei (CN)

(*) Notice: Subject to any disclaimer, the term of this patent is extended or adjusted under 35 U.S.C. 154(b) by 0 days. days.

(21) Appl. No.: 15/455,980

(22) Filed: Mar. 10, 2017

(65) Prior Publication Data

US 2017/0264331 A1 Sep. 14, 2017

(30) Foreign Application Priority Data

Mar. 10, 2016 (CN) .................. 2016 2 01827105 U

(51) Int. Cl.
| | |
|---|---|
| *H04M 1/00* | (2006.01) |
| *H04B 1/3888* | (2015.01) |
| *E05B 65/00* | (2006.01) |
| *A45C 13/00* | (2006.01) |
| *A45C 11/00* | (2006.01) |

(52) U.S. Cl.
CPC ............ *H04B 1/3888* (2013.01); *A45C 11/00* (2013.01); *A45C 13/002* (2013.01); *E05B 65/006* (2013.01); *A45C 2011/002* (2013.01)

(58) Field of Classification Search
CPC .................................................. H04M 1/0249
USPC ........................................... 455/575.1, 575.8
See application file for complete search history.

(56) References Cited

U.S. PATENT DOCUMENTS

| | | | | |
|---|---|---|---|---|
| 7,069,063 | B2* | 6/2006 | Halkosaari | H04M 1/0283 200/302.1 |
| 8,825,124 | B1* | 9/2014 | Davies | H04B 1/3888 455/550.1 |
| 2009/0111543 | A1* | 4/2009 | Tai | H04M 1/0283 455/575.8 |
| 2012/0000908 | A1* | 1/2012 | So | A45C 11/00 220/281 |
| 2012/0309475 | A1* | 12/2012 | Johnson | H04M 1/04 455/575.8 |
| 2015/0038200 | A1* | 2/2015 | Kennard | A45C 11/00 455/575.8 |
| 2015/0141096 | A1* | 5/2015 | Murphy | B23P 19/00 455/575.8 |

* cited by examiner

*Primary Examiner* — Wen Huang
(74) *Attorney, Agent, or Firm* — Muncy, Geissler, Olds & Lowe, P.C.

(57) ABSTRACT

A phone cover with rotary latch including a first frame, a second frame, a limiting piece, and limiting grooves is provided. The first frame and the second frame are separated structures. A limiting hole and a positioning post are configured at the frame connecting ends disposed at the two sides of the first frame respectively. A limiting post and a positioning post are configured at the frame connecting ends disposed at the two sides of the second frame. A positioning hole is disposed in middle of the limiting piece, limiting protrusions are disposed in two ends of the limiting piece. The limiting hole is disposed corresponding to the limiting post, and the limiting post is embedded in the limiting hole. Limiting grooves are disposed at one connecting end of the first frame and one connecting end of the second frame respectively, and each limiting groove is configured with the limiting protrusion.

4 Claims, 5 Drawing Sheets

100
PHONE COVER WITH ROTARY LATCH

CROSS-REFERENCE TO RELATED APPLICATION

The present application claims the benefit of Chinese Utility Model Patent Application No. 201620182710.5, entitled PHONE COVER WITH ROTARY LATCH, filed on Mar. 10, 2016, the entire contents of which are incorporated by reference.

BACKGROUND

Technical Field

The disclosure is related to a phone cover. More particularly, the disclosure relates to a phone cover with rotary latch.

Related Art

In the late of 1990s, phone covers become prevalent with launch of slim phones. The diversity of the types of the phone covers increase with the various brands and the functions of the mobile phones. For example, the material of the phone cover can be leather, silicone, cloth, hard plastic, soft plastic, cashmere, silk . . . etc. In addition, there are different types of mobile phones, like straight type and flip type. By restrictions of phone types, there are different types of phone covers.

With the development of smart phones, the demands for the phone covers are getting higher and higher. The function of anti-falling with fashion is one of the main demands. The traditional phone cover may cover the design of the back of the smart phone, which may make the logo of the mobile phone invisible. This would influence the fashion of the mobile phone. In addition, external tools (like screwdriver) are required in the requirements of disassembly which even scratch the phone frame and screen.

SUMMARY

Accordingly, an object of the disclosure is to provide a phone cover with rotary latch for solving the problems mentioned in the background.

To achieve the foregoing and other objects, a phone cover with rotary latch is provided. The phone cover comprises a first frame, a second frame, a limiting piece, a limiting hole, a limiting post, positioning posts, and limiting grooves. The first frame and the second frame are separate structures. The limiting hole and one positioning post are configured at the frame connecting ends disposed at the two sides of the first frame respectively. The limiting post and one positioning post are configured at the frame connecting ends disposed at the two sides of the second frame. A positioning hole is disposed in the middle of the limiting piece. The limiting protrusions are disposed at two ends of the limiting piece. The limiting hole is disposed corresponding to the limiting post. The limiting post is embedded in the limiting hole. Numbers of the limiting grooves are two. The two limiting grooves are disposed at one connecting end of the first frame and one connecting end of the second frame respectively, and each limiting groove is configured with the limiting protrusion.

In one embodiment, the limiting protrusions and the positioning hole are disposed corresponding to the limiting grooves and the positioning posts respectively.

In one embodiment, a microphone hole and a USB port are disposed on the bottom side of the second frame, and a volume button and a power button are disposed on two sides of the second frame respectively.

In one embodiment, the positioning hole is connected to the positioning posts pivotally.

Compared with the prior art, the disclosure has the good performance of anti-falling and would not cover the design and logo configured in front and back of the mobile phone for having a fashionable type. The phone cover with rotary latch is easy to use, easy to disassemble, and easy to disassemble and assemble without using external tools. It is practical and easy to popularize.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

Figure 1:
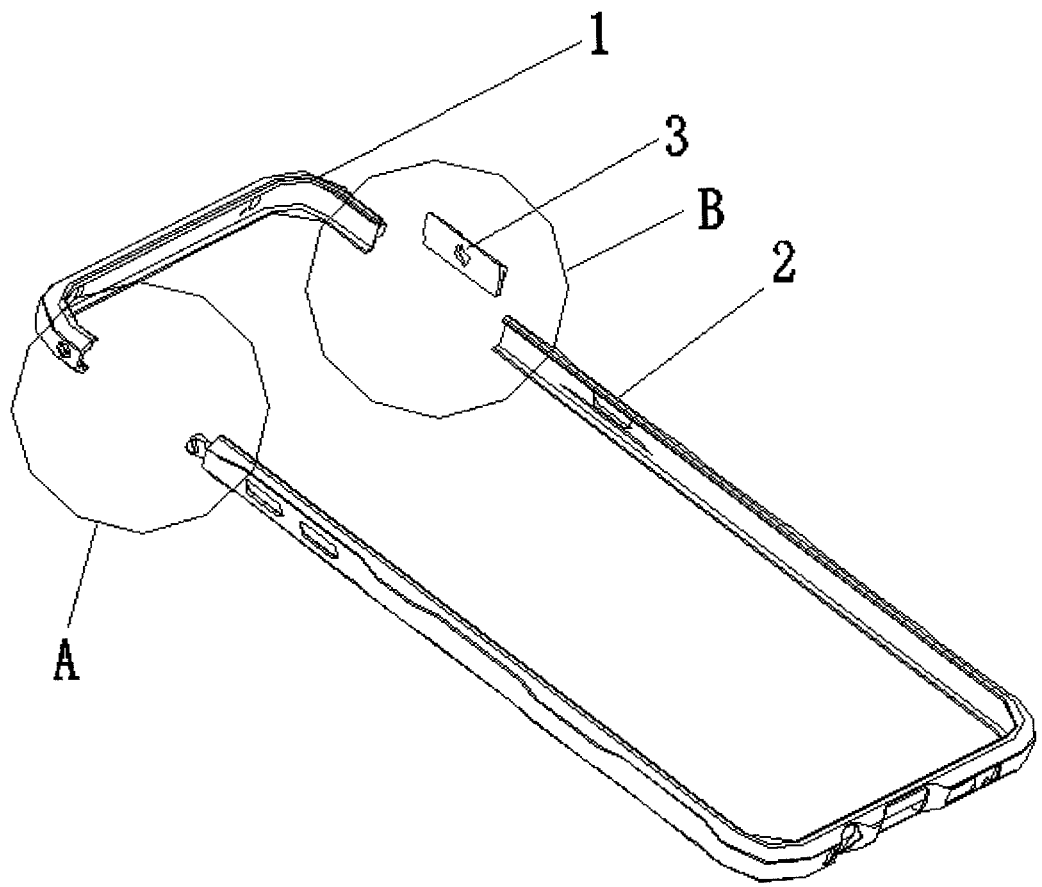
FIG. 1 is a schematic view illustrating a phone cover with rotary latch according to one embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following description with reference to the accompanying drawings is provided to explain the exemplary embodiments of the disclosure. Note that in the case of no conflict, the embodiments of the present disclosure and the features of the embodiments may be arbitrarily combined with each other.

Figure 2:
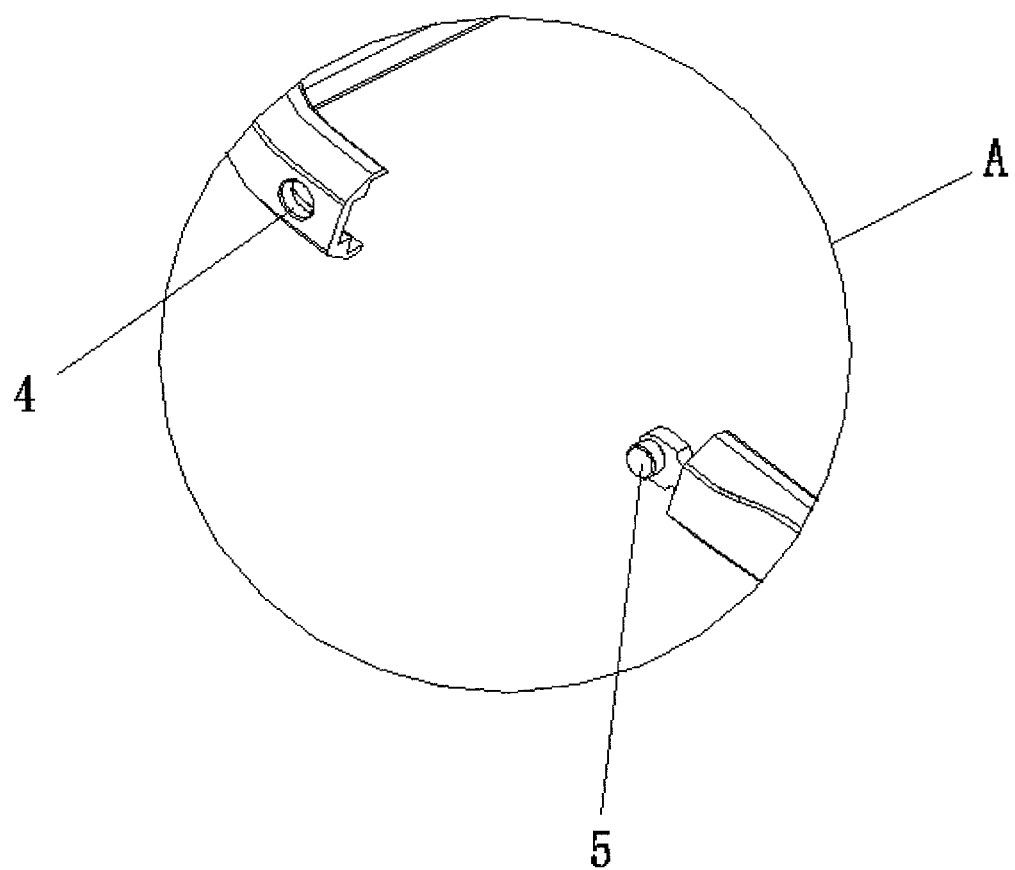
FIG. 2 is a schematic view illustrating the zone A depicted in FIG. 1.
Figure 3:
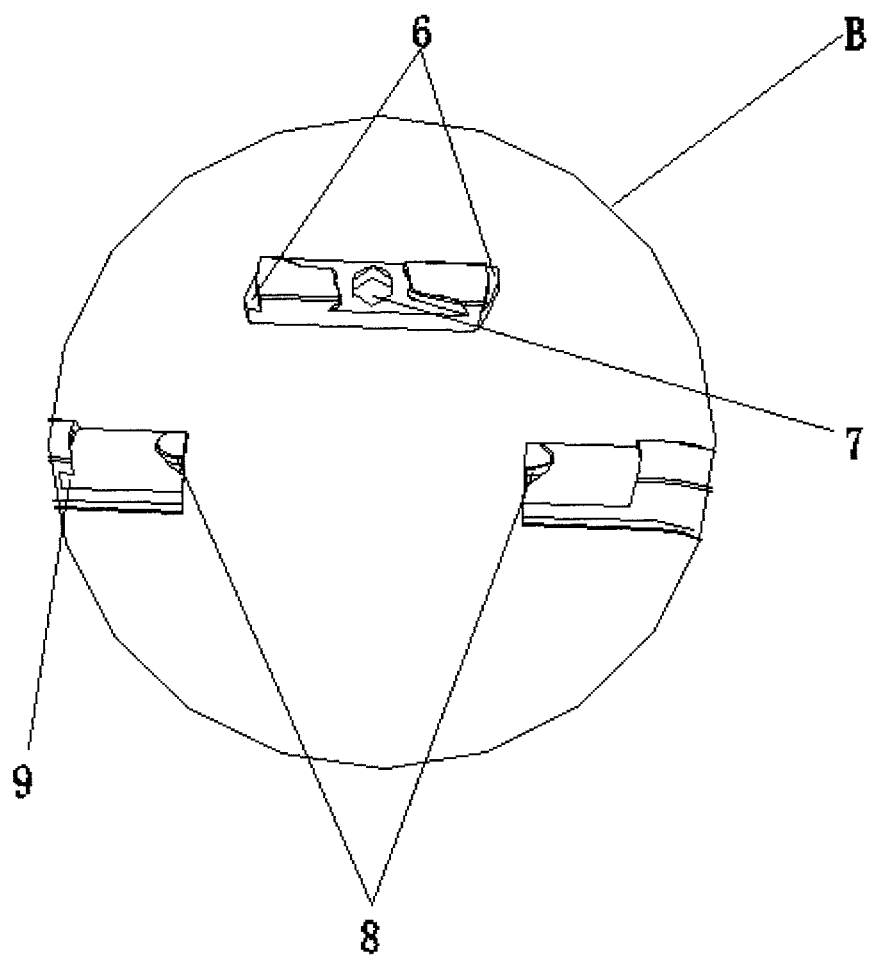
FIG. 3 is a schematic view illustrating the zone B depicted in FIG. 1.
Figure 4:
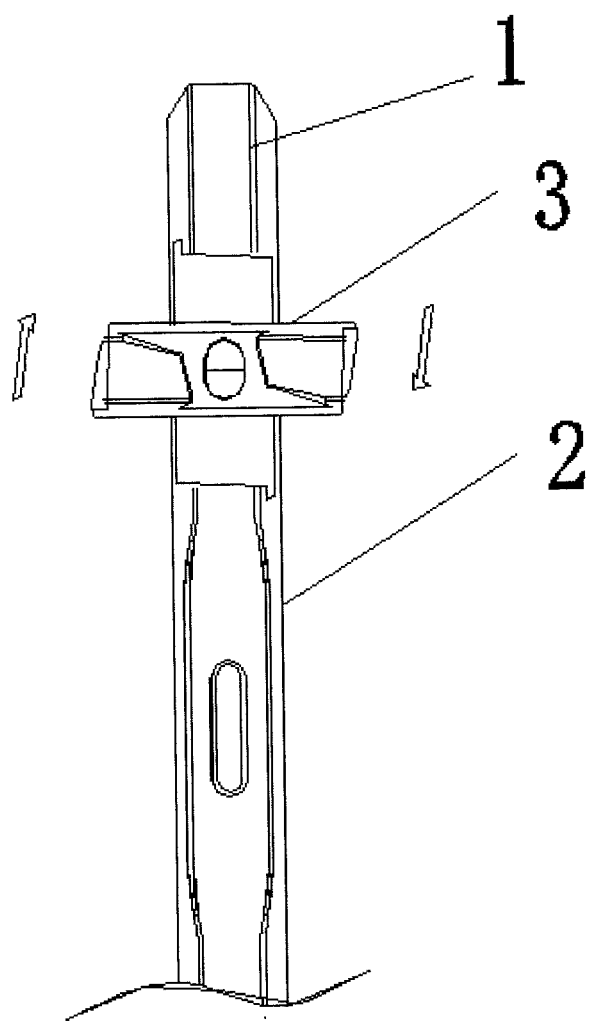
FIG. 4 is a schematic view illustrating the installation of the limiting piece.
Figure 5:
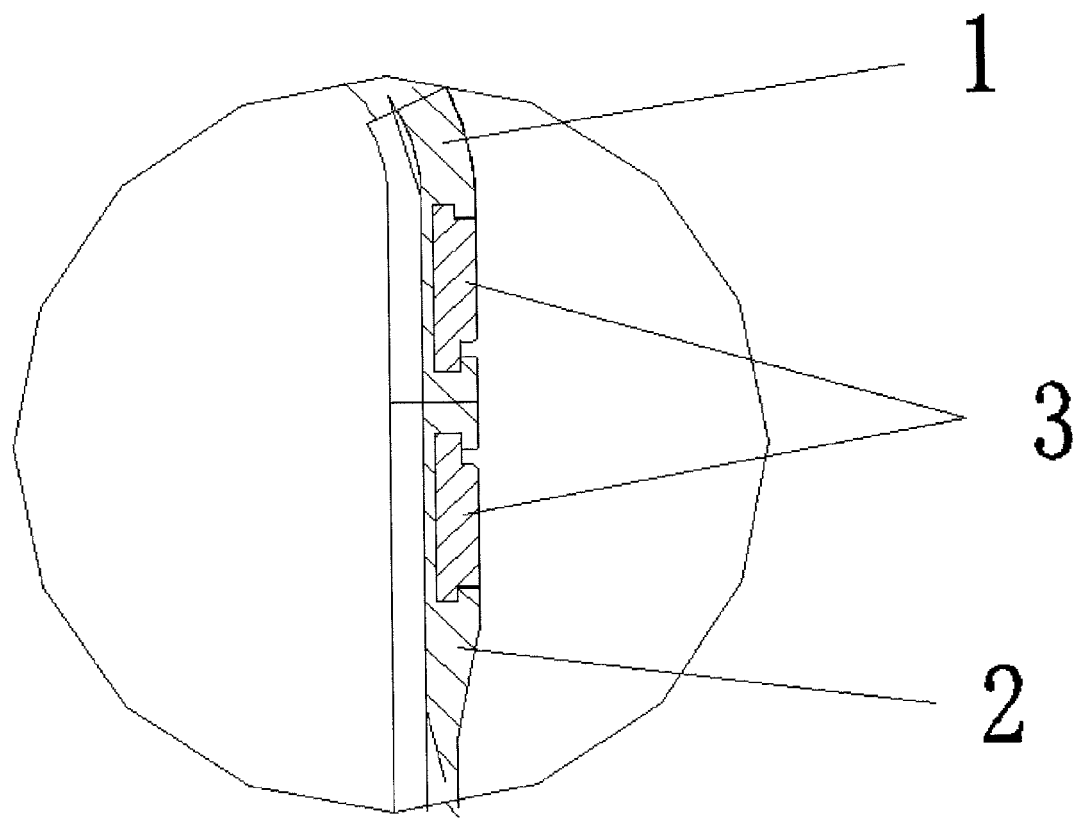
FIG. 5 is a sectional view illustrating the installation of the limiting piece.

Referring FIGS. 1-5, a phone cover with rotary latch is provided in one embodiment of the disclosure. The phone cover with rotary latch includes a first frame 1, a second frame 2, a limiting piece 3, a limiting hole 4, a limiting post 5, positioning posts 8, and limiting grooves 9. The first frame 1 and the second frame 2 are separate structures. The limiting hole 4 and one positioning post 8 are configured at the frame connecting ends disposed at the two sides of the first frame 1 respectively. The limiting post 5 and one positioning post 8 are configured at the frame connecting ends disposed at the two sides of the second frame 2. The positioning hole 7 is disposed in the middle of the limiting piece 3. The limiting protrusions 6 are disposed at the two ends of the limiting piece 3. The limiting hole 4 is disposed corresponding to the limiting post 5. The limiting post 5 is embedded in the limiting hole 4. Numbers of the limiting grooves 9 are two. The two limiting grooves 9 are disposed at one connecting end of the first frame 1 and one connecting end of the second frame 2 respectively, and each limiting groove 9 is configured with the limiting protrusion 6.

In one embodiment, the limiting protrusions 6 and the positioning hole 7 are disposed corresponding to the limiting grooves 9 and the positioning posts 8 respectively.

In one embodiment, a microphone hole and a USB port are disposed on the bottom side of the second frame 2, and a volume button and a power button are disposed on two sides of the second frame 2 respectively.

In one embodiment, the positioning hole 7 is connected to the positioning posts 8 pivotally.

The phone cover may be assembled as follows. The limiting post 5 can be installed in the limiting hole 4 first, and then the phone can be installed in the inner grooves of the first frame 1 and the second frame 2 correspondingly. Next, the two positioning posts 8 can be connected. The positioning hole 7 configured in the middle of the limiting piece 3 can be set in the positioning posts 8. At this time, the limiting piece 3 is vertical to the first frame 1 and the second frame 2. Then, the limiting piece 3 can be rotated 90° around the positioning post 8 for enabling the limiting protrusion 6 to insert in the limiting groove 9.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A phone cover with rotary latch, comprising:
a first frame, a second frame, a limiting piece, and limiting grooves,
wherein, the first frame and the second frame are separate structures, a limiting hole and a first positioning post are configured at the frame connecting ends disposed at the two sides of the first frame respectively, a limiting post and a second positioning post are configured at the frame connecting ends disposed at the two sides of the second frame; a positioning hole is disposed in the middle of the limiting piece, limiting protrusions are disposed in the two ends of the limiting piece; the limiting hole is disposed corresponding to the limiting post, and the limiting post is embedded in the limiting hole; number of the limiting grooves are two; the two limiting grooves are disposed at one connecting end of the first frame and one connecting end of the second frame respectively, and each limiting groove is configured with the limiting protrusion.

2. The phone cover of the rotary latch according to claim 1, wherein the limiting protrusions and the positioning hole are disposed corresponding to the limiting grooves and the positioning posts respectively.

3. The phone cover of the rotary latch according to claim 1, wherein a microphone hole and a USB port are disposed on the bottom side of the second frame and a volume button and a power button are disposed on two sides of the second frame respectively.

4. The phone cover of the rotary latch according to claim 1, wherein the positioning hole is connected to the positioning posts pivotally.

* * * * *